United States Patent
Su et al.

(10) Patent No.: US 9,928,831 B2
(45) Date of Patent: Mar. 27, 2018

(54) SPEECH DATA RECOGNITION METHOD, APPARATUS, AND SERVER FOR DISTINGUISHING REGIONAL ACCENT (71) Applicant: Baidu Online Network Technology (Beijing) Co., Ltd., Beijing (CN)

(72) Inventors: Dan Su, Beijing (CN); Zhao Yin, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/896,368

(22) PCT Filed: Dec. 18, 2014

(86) PCT No.: PCT/CN2014/094205
§ 371 (c)(1),
(2) Date: Dec. 4, 2015

(87) PCT Pub. No.: WO2015/090215
PCT Pub. Date: Jun. 25, 2015

(65) Prior Publication Data
US 2016/0284344 A1 Sep. 29, 2016

(30) Foreign Application Priority Data
Dec. 19, 2013 (CN) .......................... 2013 1 0703949

(51) Int. Cl.
*G10L 15/00* (2013.01)
*G10L 15/07* (2013.01)
(Continued)

(52) U.S. Cl.
CPC ............ *G10L 15/07* (2013.01); *G10L 15/005* (2013.01); *G10L 15/02* (2013.01); *G10L 15/06* (2013.01);
(Continued)

(58) Field of Classification Search
CPC ....... G10L 15/07; G10L 15/02; G10L 15/005; G10L 15/06; G10L 25/90; G10L 25/84; G10L 15/01
(Continued)

(56) References Cited

U.S. PATENT DOCUMENTS

2009/0030687 A1 1/2009 Cerra et al.
2011/0295590 A1 12/2011 Lloyd et al.
(Continued)

FOREIGN PATENT DOCUMENTS

CN 1692407 A 11/2005
CN 101329868 A 12/2008
(Continued)

OTHER PUBLICATIONS

International Search Report in PCT/CN2014/094205 dated Mar. 13, 2015 in 4 pages.
(Continued)

*Primary Examiner* — Thierry L Pham
(74) *Attorney, Agent, or Firm* — Knobbe Martens Olson & Bear LLP (57) ABSTRACT

A speech data recognition method, apparatus, and server are for distinguishing regional accent. The speech data recognition method includes: calculating a speech recognition confidence and/or a signal-to-noise ratio of the speech data, and screening a regional speech data from the speech data based on the speech recognition confidence and/or the signal-to-noise ratio of the speech dat; and determining a region to which the regional speech data belongs based on a regional attribute of the regional speech data. The regional speech data are automatically recognized from the mass speech data by calculating the speech recognition confidence, the signal-to-noise ratio of the speech data or the combination thereof, thereby avoiding manual labeling of the speech data and enhancing the efficiency of the speech data processing.

9 Claims, 5 Drawing Sheets (51) Int. Cl.
*G10L 15/06* (2013.01)
*G10L 15/02* (2006.01)
*G10L 15/01* (2013.01)
*G10L 25/90* (2013.01)
*G10L 25/84* (2013.01)

(52) U.S. Cl.
CPC .............. *G10L 15/01* (2013.01); *G10L 25/84* (2013.01); *G10L 25/90* (2013.01)

(58) Field of Classification Search
USPC .................................................. 704/226, 233
See application file for complete search history.

(56) References Cited

U.S. PATENT DOCUMENTS

| | | | |
|---|---|---|---|
| 2012/0022869 A1* | 1/2012 | Lloyd ................... | G10L 15/065 704/244 |
| 2014/0207460 A1* | 7/2014 | Jiang ....................... | G10L 17/12 704/246 |
| 2014/0288932 A1* | 9/2014 | Yeracaris ................ | G10L 15/30 704/249 |

FOREIGN PATENT DOCUMENTS

| | | |
|---|---|---|
| CN | 102918591 A | 2/2013 |
| CN | 103038817 A | 4/2013 |
| CN | 103337245 A | 10/2013 |
| CN | 103680493 A | 3/2014 |
| JP | 200771904 A | 3/2007 |

OTHER PUBLICATIONS

Min, et al., "Speaker Identification Using Score-based Confidence in Noisy Environments," Speech Sciences, 14(4), Dec. 2007, 145-156, 13 pages.

Liu et al., "The Theory and Applications of Confidence Measures in Speech Recognition", Journal of Computer Research & Development, vol. 37, No. 7, Jul. 2000.

* cited by examiner

SPEECH DATA RECOGNITION METHOD, APPARATUS, AND SERVER FOR DISTINGUISHING REGIONAL ACCENT

CROSS REFERENCE TO RELATED APPLICATIONS

This application is the U.S. National Phase Application under 35 U.S.C. § 371 of International Application No. PCT/CN2014/094205, filed Dec. 18, 2014, designating the U.S. and published as WO/2015/090215 on Jun. 25, 2015 which claims the benefit of Chinese Patent Application No. 201310703949.3, filed Dec. 19, 2013. Any and all applications for which a foreign or a domestic priority is claimed is/are identified in the Application Data Sheet filed herewith and is/are hereby incorporated by reference in their entirety under 37 C.F.R. § 1.57.

FIELD OF THE INVENTION

The present invention relates to the technical field of speech data processing, and particularly to a speech data recognition method, apparatus, and server for distinguishing regional accents.

BACKGROUND OF THE INVENTION

The vast territory of China boosts a variety of dialects containing regional accents in Chinese language. The dialects in different regions vary in pronunciation characteristics and speech rate characteristics. Therefore, when speech recognition is performed on the dialects in different regions with the same acoustic model, it will arise that the recognition accuracy is not high. In order to solve the low recognition accuracy problem when performing speech recognition on different regional accents with the same acoustic model applicable to Chinese Mandarin, it is a good approach to train, for dialects in different regions, acoustic models customized for various dialects.

Mass training data are needed to train an acoustic model. Currently, with the ubiquity of instant messaging tools such as WeChat, MiTalk, a considerable amount of primary speech data are available on the Internet. These speech data may act as training data for training acoustic models for dialects in different regions. However, in the prior art, there is no automated method for distinguishing, among these speech data, which are speech data in Chinese Mandarin, and which are regional speech data, such that before training acoustic models for regional accents using the primary speech data, it is first required to manually label the primary speech data with regional tags, which will consume a considerable amount of personnel and material resources.

SUMMARY OF THE INVENTION

The embodiments of the present invention provide a speech data recognition method, apparatus, and server for distinguishing regional accents, to automatically recognize regional speech data from primary speech data.

In a first aspect, the embodiments of the present invention provide a speech data recognition method for distinguishing regional accents, the method comprising:
calculating a speech recognition confidence and/or signal-to-noise ratio of speech data, and screening regional speech data from the speech data based on the speech recognition confidence and/or signal-to-noise ratio;
determining a region to which the regional speech data belongs based on a regional attribute of the regional speech data.

In a second aspect, the embodiments of the present invention provide a speech data recognition apparatus for distinguishing regional accents, the apparatus comprising:
a speech data screening module configured to calculate a speech recognition confidence and/or signal-to-noise ratio of speech data, and screen regional speech data from the speech data based on the speech recognition confidence and/or signal-to-noise ratio;
a region determining module configured to determine a region to which the regional speech data belongs based on a regional attribute of the regional speech data.

In a third aspect, the embodiments of the present invention further provide a speech data recognition server for distinguishing regional accents, comprising: a processor, a memory, and a computer program; the computer program being stored in the memory and executed by the processor; the computer program including instructions for executing the following operations:
calculating a speech recognition confidence and/or signal-to-noise ratio of speech data, and screening regional speech data from the speech data based on the speech recognition confidence and/or signal-to-noise ratio;
determining a region to which the regional speech data belongs based on a regional attribute of the regional speech data.

The speech data recognition method, apparatus, and server for distinguishing regional accents provided by the embodiments of the present invention automatically screen the regional speech data from mass speech data by calculating the confidence and/or signal-to-noise ratio of speech data, which reduces the workload for manually labeling all speech data and enhances the efficiency of speech data processing.

BRIEF DESCRIPTION OF THE DRAWINGS

Other features, objectives and advantages of the present invention will become more apparent through reading the detailed description made to the non-limiting embodiments with reference to the accompanying drawings.

DETAILED DESCRIPTION

Hereinafter, the present invention will be further described in detail with reference to the accompanying drawings and embodiments. It will be appreciated that the specific embodiments described here are intended to only explain the present invention, and not intended to limit the present invention. Additionally, it should be noted that for the ease of description, only the parts related to the present invention, rather than all of the contents, are illustrated in the accompanying drawings.

Embodiment I

Figure 1:
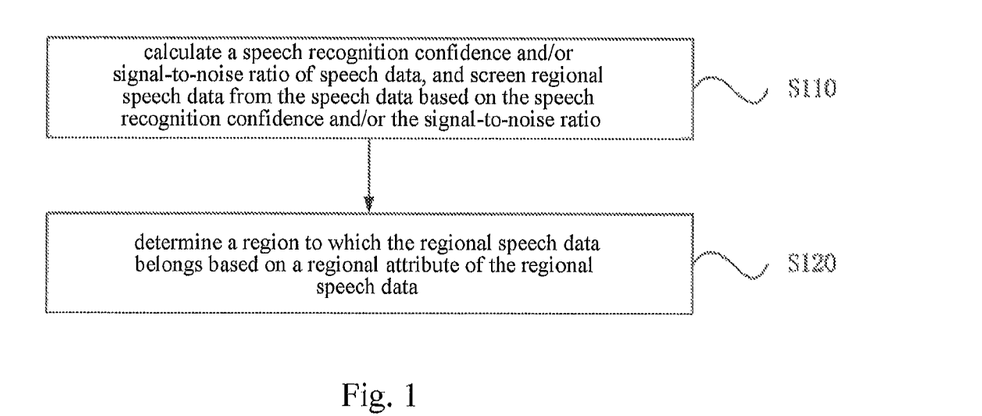
FIG. 1 shows a flow diagram of a speech data recognition method for distinguishing regional accents provided by a first embodiment of the present invention.

FIG. 1 shows a flow diagram of a speech data recognition method for distinguishing regional accents by to the first embodiment of the present invention. With reference to FIG. 1, the speech data recognition method for distinguishing regional accents comprises:

S110, calculating a speech recognition confidence and/or signal-to-noise ratio of speech data, and screening regional speech data from the speech data based on the speech recognition confidence and/or the signal-to-noise ratio.

In the prior art, the acoustic models for speech recognition are acoustic models suitable for speech training with standard Chinese Mandarin with low noise and no regional accents. When speech recognition is performed to regional speech data using these acoustic models, a situation will arise that the speech recognition confidence is not high and thus the recognition ratio for the speech recognition is not high. Due to the fact that the regional speech data do not have a high speech recognition confidence in speech recognition, the speech recognition confidence for the regional speech data may be calculated, and the regional speech data are then screened based on the calculated speech recognition confidence of the regional speech data.

However, the low speech recognition confidence of the speech data may also be caused by a relatively high noise in the speech data. After calculating the signal-to-noise ratio of the speech data, the speech data with a relatively low signal-to-noise ratio may be filtered out from the speech data, so as to remove the speech data with a low speech recognition confidence due to the low signal-to-noise ratio. After the speech data with the relatively low signal-to-noise ratio is removed from the speech data, the remaining speech data are the speech data whose low speech recognition confidence is due to the regional accent, i.e., the regional speech data.

In the present embodiment, the speech recognition confidence and/or the signal-to-noise ratio of the speech data is calculated, and the regional speech data are screened from the speech data based on the speech recognition confidence and/or the signal-to-noise ratio. It should be noted that, both the speech recognition confidence and the signal-to-noise ratio of the speech data may be calculated, and then regional speech data are screened from speech data based on the calculated speech recognition confidence and the signal-to-noise ratio. Alternatively, the speech recognition confidence or the signal-to-noise ratio of speech data may be calculated on its own, and then regional speech data are screened from the speech data based on the calculated speech recognition confidence or signal-to-noise ratio.

S120, determining a region to which the regional speech data belongs based on a regional attribute of the regional speech data.

After the regional speech data are screened from the speech data, the region to which the regional speech data belongs is determined for the screened regional speech data. In order to determine the region to which the regional speech data belongs, the region for the regional speech data needs to be determined based on the region attribute of the regional data. Preferably, the regional attribute includes a location corresponding to the source IP address of the speech data, or a location corresponding to a source user of the speech data. Because the mass speech data are first screened, the region labeling calculation based on its regional attribute is reduced, and accuracy of the regional determination is enhanced.

Figure 2:
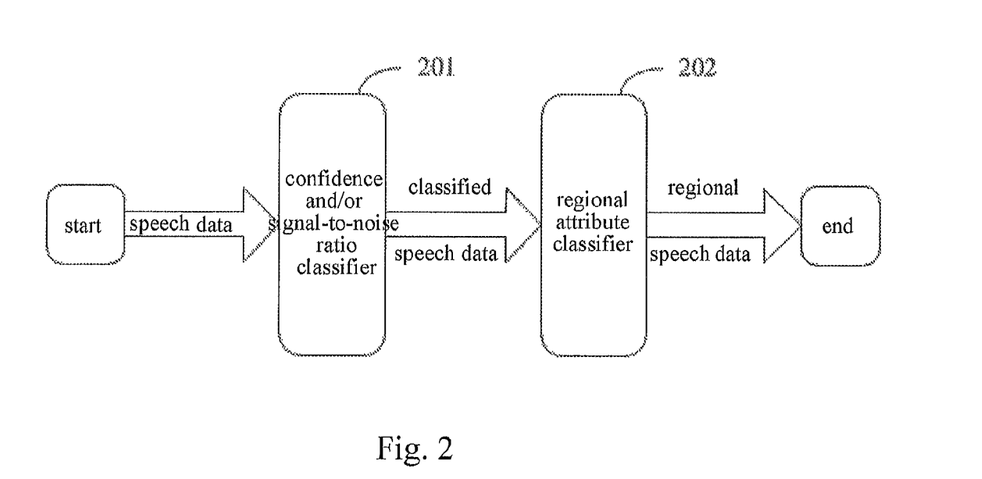
FIG. 2 shows a signal flow diagram of the speech data recognition method for distinguishing regional accents provided by the first embodiment of the present invention.

FIG. 2 shows a signal flow diagram of the speech data recognition method for distinguishing regional accents provided by the first embodiment of the present invention. Referring to FIG. 2, the speech data are inputted to a confidence and/or signal-to-noise ratio classifier 201 so as to classify the speech data based on the speech recognition confidence and/or the signal-to-noise ratio. The speech data that have been classified based on the speech recognition confidence and/or signal-to-noise ratio are inputted to a regional attribute classifier 202 so as to classify the speech data based on the regional attribute of the speech data. Finally, the regional speech data that have been classified based on the regional attribute are obtained.

According to the present embodiment, the regional data are screened from the mass speech data by calculating the speech recognition confidence coefficient and/or the signal-to-noise ratio of the speech data, so that automatic recognition of the regional speech data from the mass speech data are achieved, which reduces the workload of manual labeling mass speech data and also enhances the efficiency of the speech data processing.

Embodiment II

Figure 3:
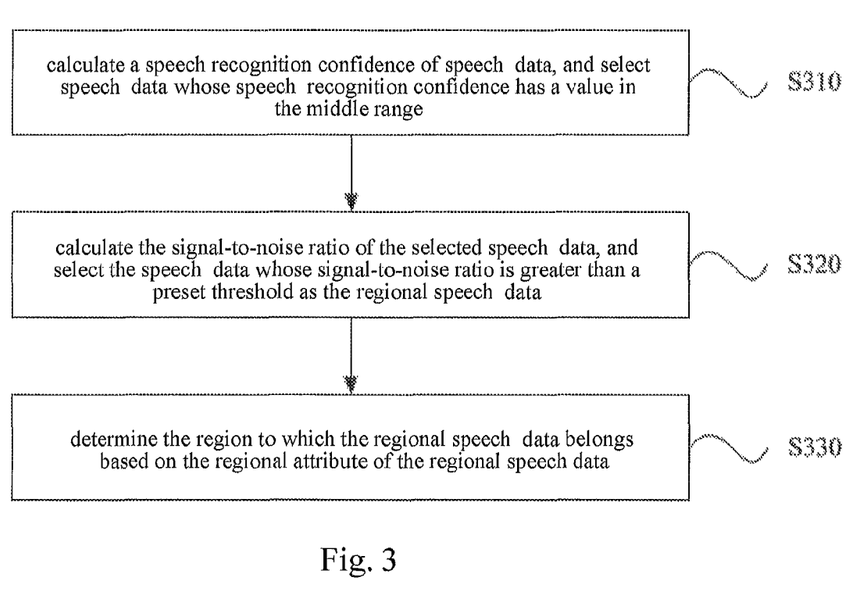
FIG. 3 shows a flow diagram of a speech data recognition method for distinguishing regional accents provided by a second embodiment of the present invention.

FIG. 3 shows a flow diagram of a speech data recognition method for distinguishing regional accents provided by a second embodiment of the present invention. The speech data recognition method for distinguishing regional accents is based on the above embodiment. Particularly, calculating a speech recognition confidence and/or a signal-to-noise ratio of speech data, and screening regional speech data from the speech data based on the speech recognition confidence and/or the signal-to-noise ratio comprises: calculating speech recognition confidence of speech data, and selecting speech data with a mid-range speech recognition confidence; calculating the signal-to-noise ratio of the selected speech data, and selecting the speech data whose signal-to-noise ratio is greater than a preset threshold as the regional speech data.

With reference to FIG. 3, the speech data recognition method for distinguishing regional accent comprises the following steps.

S310, calculating a speech recognition confidence of the speech data, and selecting speech data with a mid-range speech recognition confidence.

Being confident means the probability of being correct. Confidence is a measure for evaluating this probability, indicating the reliability of a given event. In speech recognition, the confidence is defined as a function for measuring a correlation degree between a model and observed data, and the value of the function provides a comparability for various observed data.

In speech recognition, the confidence research has always been a very important topic. Particularly, as the speech technology is currently widely used, new applications for estimating a confidence of a speech recognition output result and determining its reliability are developed in increasingly more areas.

In the present embodiment, the speech recognition confidence is a confidence calculated when the speech data recognition is performed.

Because the speech data of the standard Chinese Mandarin speech generally have a high confidence when recognition is performed using a speech recognition algorithm, the speech data having a confidence value in the higher range are excluded, in other words, the Chinese Mandarin speech data are excluded. Meanwhile, data with lower confidence possibly do not contain valid speech, such that the speech data having a confidence value in the lower range are excluded, in other words, the invalid speech data. Therefore, after the speech recognition confidence is calculated, the speech data with a mid-range speech recognition confidence are selected as potential regional speech data. Selecting the mid-range confidence refers to excluding value ranges at the higher and lower ends, while retaining the values in the middle. The size of the excluded value range is not limited here, and may be set based on empirical values or actual demands. In the present embodiment, it is preferable to use the speech data whose speech recognition confidence is in the range between 30%-80% as potential speech data.

Calculating the speech recognition confidence of the speech data is based on the speech data characteristics. The characteristics that may be used to calculate the speech recognition confidence of the speech data may include likelihood, state residing information, and likelihood ratio of the speech data.

The likelihood is an index indicating a similarity between the speech data and the model data. The state residing information refers to relevant information indicating the acoustic model residing at a certain speech recognition state during the speech recognition process. The likelihood ratio is a ratio indicating the similarity between the speech data and the model data.

In the present embodiment, the speech recognition confidence of the speech data may be calculated based on the likelihood, the state residing information, and the likelihood ratio of the speech data.

S320, calculating the signal-to-noise ratio of the selected speech data, and deeming the speech data whose signal-to-noise ratio is greater than a preset threshold as regional speech data.

The reason causing the speech data not having a high confidence in speech recognition may also be that the speech data contains a higher amount of noise. Therefore, the signal-to-noise ratio of the selected speech data are calculated, speech data with a low signal-to-noise ratio is removed, and speech data having a high signal-to-noise ratio is deemed as regional speech data.

The signal-to-noise ratio is the ratio between the normal speech signal power in the speech data and the noise signal power in the speech data. Calculating the signal-to-noise ratio of the selected speech data, and deeming the speech data with a relatively high signal-to-noise ratio as the regional speech data refers to calculating a ratio between the normal speech signal power in the selected speech data and the noise signal power in the speech data, and then deeming the speech data with the ratio between the normal speech signal power and the noise signal power in the speech data higher than a signal-to-noise ratio threshold as the regional speech data.

S330, determining the region to which the regional speech data belongs based on the regional attribute of the regional speech data.

After regional speech data are recognized from the mass speech data by calculating the speech recognition confidence and the signal-to-noise ratio, a region to which for the regional speech data belongs is determined based on the regional attribute of the regional speech data.

Preferably, the region to which the regional speech data belongs may be determined based on a location corresponding to a source IP address of the speech data or a location corresponding to the source user of the speech data.

Figure 4:
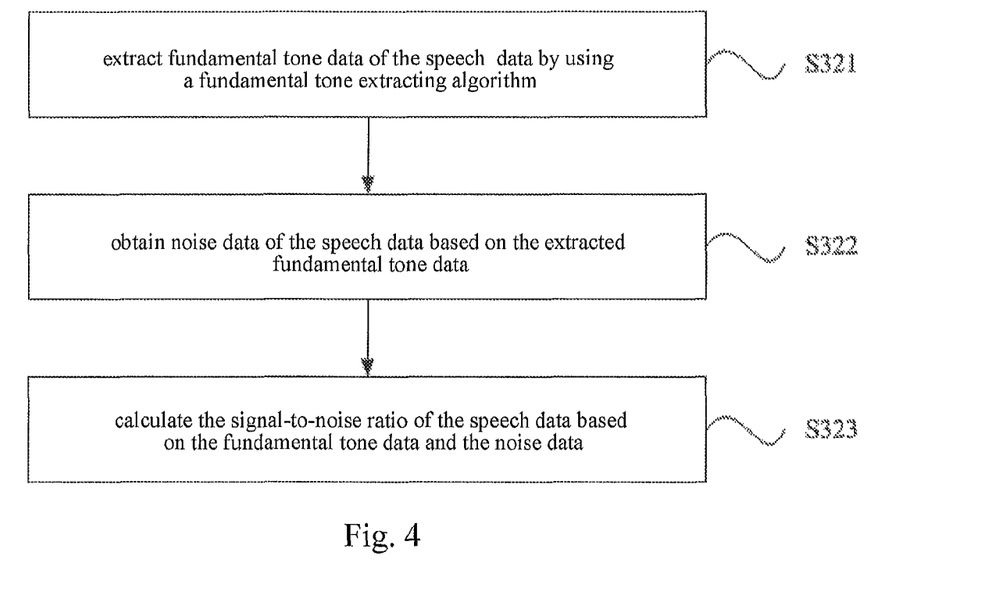
FIG. 4 shows a flow diagram of calculating the signal-to-noise ratio in the speech data recognition method for distinguishing regional accents provided by the second embodiment of the present invention.

FIG. 4 shows a flow diagram for calculating a signal-to-noise ratio in the speech data recognition method for distinguishing regional accents provided by the second embodiment of the present invention. Referring to FIG. 4, preferably, calculating the signal-to-noise ratio of the selected speech data comprises the following steps.

S321, extracting fundamental tone data of the speech data using a fundamental tone extracting algorithm.

In order to calculate the signal-to-noise ratio of the speech data, first, it should be distinguished, from among the speech data, which part is the fundamental data of the speech data, i.e., normal speech data, and which part is the noise data of the speech data.

The fundamental tone data extracting algorithm is an algorithm for extracting fundamental tone data from the speech data. A typical fundamental tone extracting algorithm includes one of the spectral subtraction, the Wiener-filtration, and the short-term spectrum minimum mean square error estimation method. In the present embodiment, the fundamental tone data may be extracted from the speech data using the spectral subtraction, the Wiener-filtration, or the short-term spectrum minimum mean square error estimation method.

S322, obtaining the noise data of the speech data based on the extracted fundamental tone data.

After the fundamental tone data are obtained from the speech data, the remaining speech data are the noise data in the speech data. Therefore, the noise data in the speech data may be obtained by simply obtaining the difference between the speech data and the fundamental tone data extracted from the speech data.

S323, calculating the signal-to-noise ratio of the speech data based on the fundamental tone data and the noise data.

After the fundamental tone data and noise data of the speech data are acquired from the speech data, the signal-to-noise ratio of the speech data may be calculated based on the fundamental tone data and the noise data. Specifically, the fundamental tone data power and the noise data power may be first calculated, and then the ratio therebetween is calculated, thereby obtaining the signal-to-noise ratio of the speech data.

Figure 5:
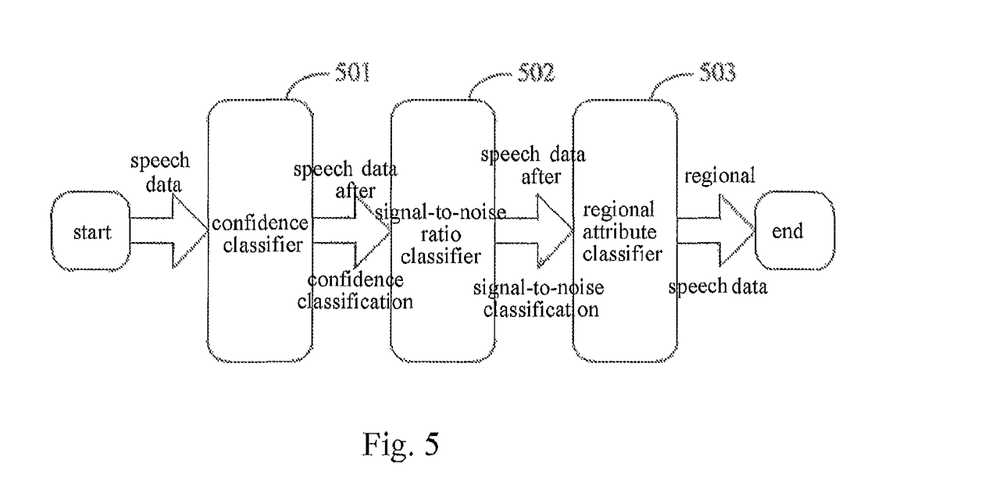
FIG. 5 shows a signal flow diagram of the speech data recognition method for distinguishing regional accents provided by the second embodiment of the present invention.

FIG. 5 shows a signal flow diagram of the speech data recognition method for distinguishing regional accents provided by the second embodiment of the present invention. With reference to FIG. 5, the speech data are inputted in a confidence classifier 501 so as to classify the speech data based on the speech recognition confidence. The speech data with a mid-range speech recognition confidence are inputted into a signal-to-noise ratio classifier 502 so as to classify the speech data based on the signal-to-noise ratio. Then, the speech data having a high signal-to-noise ratio are inputted to a regional attribute classifier 503 so as to classify the speech data based on a regional attribute of the speech data. Finally, the speech data that have been classified based on the regional attribute are deemed as the regional speech data.

According to the present embodiment, the speech data with a mid-range speech recognition confidence and a signal-to-noise ratio that is higher than a preset threshold are first screened. This operation may reduce the data volume to be processed in subsequent operations for distinguishing regions using the regional attributes. Then, the speech data are classified based on the regional attribute of the speech data so as to screen and label the regional speech data, further enhancing the efficiency for processing the speech data.

Embodiment III

Figure 6:
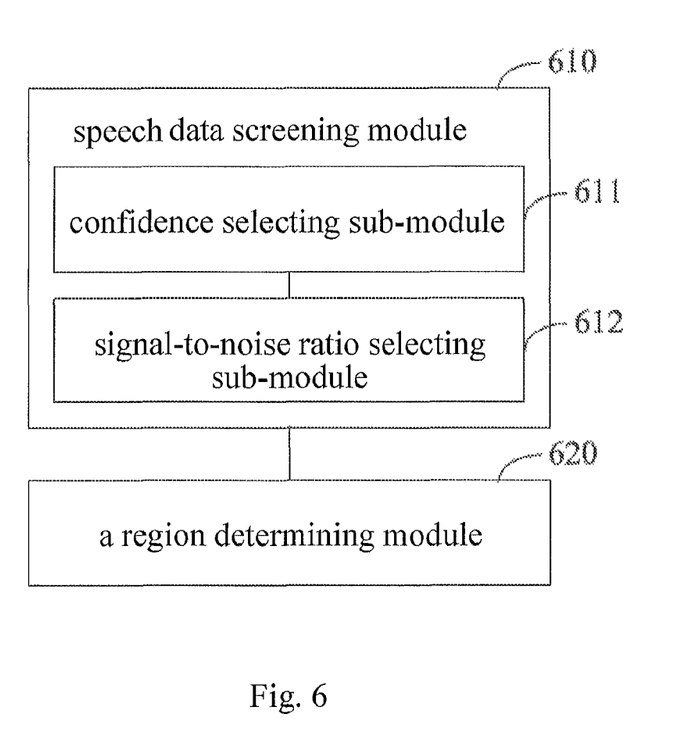
FIG. 6 shows a structural diagram of a speech data recognition apparatus for distinguishing regional accents provided by a third embodiment of the present invention.

FIG. 6 shows a structural diagram of a speech data recognition apparatus for distinguishing regional accents provided by a third embodiment of the present invention. With reference to FIG. 6, the speech data recognition apparatus for distinguishing regional accents comprises a speech data screening module 610 and a region determining module 620.

The speech data screening module 610 is configured to calculate a speech recognition confidence and/or signal-to-noise ratio of speech data, and screen regional speech data from the speech data based on the speech recognition confidence and/or the signal-to-noise ratio.

The region determining module 620 is configured to determine a region to which the regional speech data belongs based on a regional attribute of the regional speech data.

Preferably, the speech data screening module 610 comprises: a confidence selecting sub-module 611 and a signal-to-noise ratio selecting sub-module 612.

The confidence selecting sub-module 611 is configured to calculate a speech recognition confidence of the speech data, and select speech data with a mid-range speech recognition confidence.

The signal-to-noise ratio selecting sub-module 612 is configured to calculate the signal-to-noise ratio of the selected speech data, and deem the speech data whose signal-to-noise ratio is greater than a preset threshold as the regional speech data.

Preferably, the regional attribute includes a location corresponding to a source IP address of the speech data, or a location corresponding to a source user of the speech data.

Preferably, the speech data screening module for calculating the speech recognition confidence of speech data calculates the speech recognition confidence of the speech data based on likelihood, state residing information, and likelihood ratio of the speech data.

Preferably, the selected mid-range is 30%-80%.

Preferably, the speech data screening module calculates the signal-to-noise ratio of the speech data by:
  extracting fundamental tone data of the speech data by using a fundamental tone extracting algorithm;
  obtaining noise data of the speech data based on the extracted fundamental tone data;
  calculating the signal-to-noise ratio of the speech data based on the fundamental tone data and the noise data.

Preferably, the fundamental tone extracting algorithm includes the spectral subtraction, the Wiener-filtration, and the short-term spectrum minimum mean square error estimation method.

According to the present embodiment, an automatic recognition of regional speech data from the mass speech data is achieved by calculating the speech recognition confidence and the signal ratio of the speech data and selecting speech data with a mid-range speech recognition confidence and has a high signal-to-noise ratio as the regional speech data, thereby avoiding manually labeling speech data and enhancing the efficiency of speech data processing. The serial numbers of the above embodiments of the invention are only for descriptive purposes, not representing the priorities of the embodiments.

Embodiment IV

The present embodiment further provides a non-volatile computer storage medium. The computer storage medium stores one or more modules that, when being executed by a server that performs a speech data recognition method for distinguishing regional accents, cause the server to perform the following operations:
  calculating a speech recognition confidence and/or signal-to-noise ratio of speech data, and screening regional speech data from the speech data based on the speech recognition confidence and/or the signal-to-noise ratio;
  determining a region to which the regional speech data belongs based on a regional attribute of the regional speech data.

When the module stored in the storage medium is executed by the server, the calculating the speech recognition confidence of the speech data and/or the signal-to-noise ratio and the screening the regional speech data from the speech data based on the speech recognition confidence and/or the signal-to-noise ratio may preferably comprise:
  calculating the speech recognition confidence of the speech data, and selecting the speech data with a mid-range speech recognition confidence;
  calculating the signal-to-noise ratio of the selected speech data, and selecting the speech data whose signal-to-noise ratio is greater than a preset threshold as the regional speech data.

When the module stored in the storage medium is executed by the server, the regional attribute may preferably include a location corresponding to a source IP address of the speech data, or a location corresponding to a source user of the speech data.

When the module stored in the storage medium is executed by the server, the calculating the speech recognition confidence of speech data may preferably comprise:
  calculating the speech recognition confidence of the speech data based on likelihood, state residing information, and likelihood ratio of the speech data.

When the module stored in the storage medium is executed by the server, the selected mid-range is preferably 30%-80%.

When the module stored in the storage medium is executed by the server, the calculating a signal-to-noise ratio of speech data may preferably comprise:
  extracting fundamental tone data of the speech data by using a fundamental tone extracting algorithm;
  obtaining noise data of the speech data based on the extracted fundamental tone data; and
  calculating the signal-to-noise ratio of the speech data based on the fundamental tone data and the noise data.

When the module stored in the storage medium is executed by the server, the fundamental tone extracting algorithm may preferably include the spectral subtraction, the Wiener-filtration, and the short-term spectrum minimum mean square error estimation method.

Embodiment V

Figure 7:
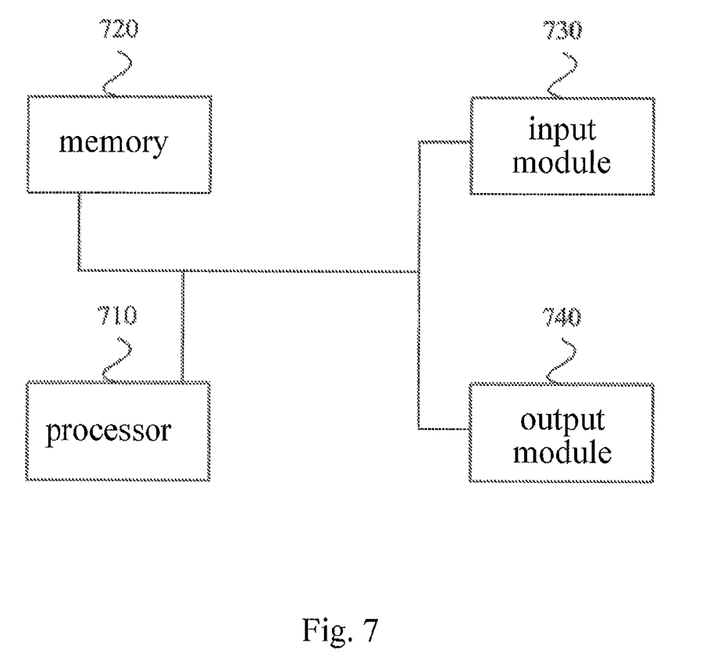
FIG. 7 shows a hardware structure diagram of a speech data recognition server for distinguishing regional accents provided by a fifth embodiment of the present invention.

FIG. 7 shows a hardware structure diagram of a speech data recognition server for distinguishing regional accents based on a fifth embodiment of the present invention. With reference to FIG. 7, a hardware structural diagram of a server for performing a speech data recognition method for distinguishing regional accents based on a fifth embodiment of the present invention is provided. The server comprises:
one or more processors 710, wherein one processor 710 is shown in FIG. 7 as an example;
a memory 720; and one or more modules.

The server may comprise an input module 730 and an output module 740. The processor 710, the memory 720, the input module 720, and the output module 740 in the server may be connected via a bus or through other means. FIG. 7 shows an exemplary bus connection.

The memory 720, as a computer readable medium, may be used for storing software programs, computer executable programs, and modules, e.g., a program instruction/module corresponding to the speech data recognition method for distinguishing regional accents in the embodiments of the present invention (e.g., the speech data screening module 610 and the region determining module 620 in the speech data recognition apparatus for distinguishing regional accents as shown in FIG. 6). The processor 710 executes software programs, instructions, and modules stored in the memory 720, thereby performing various functional applications of the server and data processing, i.e., implementing the speech data recognition method for distinguishing regional accents in the above method embodiments.

The memory 720 may comprise a program storage area and a data storage area, wherein the program storage area may store an operating system, and an application required by at least one function. The data storage area may store data created based on the terminal device use. In addition, the memory 720 may include a high speed random access memory and may also include a non-volatile memory, e.g., at least one disc memory device, a flash memory device, or other non-volatile solid storage device. In some instances, the memory 720 may further comprise a memory remote from the processor 710. These remote memory may be connected to the terminal device via the network. Instances of the above network include, but not limited to Internet, intranet, a local area network, a mobile communication network, and a combination thereof.

The input device 730 may be used for receiving input number or character information and generating key signal inputs associated with user settings and function controls of the terminal. The output module 740 may comprise a display device as a display screen.

The one or more modules are stored in the memory 720 and perform the following operations when being performed by one or more processors 710:
calculating a speech recognition confidence and/or signal-to-noise ratio of speech data, and screening regional speech data from the speech data based on the speech recognition confidence and/or signal-to-noise ratio;
determining a region to which the regional speech data belongs based on a regional attribute of the regional speech data.

Further, the calculating a speech recognition confidence and/or signal-to-noise ratio of speech data, and screening regional speech data from the speech data based on the speech recognition confidence and/or the signal-to-noise ratio comprise:
calculating a speech recognition confidence of speech data, and selecting speech data with a mid-range speech recognition confidence;
calculating the signal-to-noise ratio of the selected speech data, and selecting the speech data whose signal-to-noise ratio is greater than a preset threshold as the regional speech data.

Further, the regional attribute includes a location corresponding to a source IP address of the speech data, or a location corresponding to a source user of the speech data.

Further, the calculating the speech recognition confidence of speech data comprises:
calculating the speech recognition confidence of the speech data based on likelihood, state residing information, and likelihood ratio of the speech data.

Further, the selected mid-range is 30%-80%.

Further, the calculating a signal-to-noise ratio of the speech data comprises:
extracting fundamental tone data of the speech data by using a fundamental tone extracting algorithm;
obtaining noise data of the speech data based on the extracted fundamental tone data;
calculating the signal-to-noise ratio of the speech data based on the fundamental tone data and the noise data.

Further, the fundamental tone extracting algorithm includes the spectral subtraction, the Wiener-filtration, and the short-term spectrum minimum mean square error estimation method.

It should be apparent to those skilled in the art that the above respective modules or respective steps of the present invention may be implemented by a general computing device. Optionally, the modules or steps may be implemented by using program code that may be executed by a computer device, such that they may be stored in a memory device and executed by the computing device. Alternatively, the modules or steps are separately implemented into respective integrated circuit modules, or several modules or steps in the above modules or steps are implemented into a single integrated circuit. Accordingly, the present invention is not limited to any specific combination of hardware and software.

Various embodiments in the description are described in a progressive manner. Each embodiment focuses on a different point from other embodiments. The same or similar parts between the embodiments may be referenced with each other.

Finally, it should be noted that in the present disclosure, a relationship such as first and second is only used for distinguishing one entity or operation from another entity or operation, but does not necessarily require or imply an existence of any such actual relationship or sequence between these entities or operations.

What have been described above are only embodiments of the present invention, not for limiting the protection scope of the present invention. Any equivalent structure or equivalent flow transformation made from the contents in the accompanying drawings of the present application, or direct or indirect application in other related technical fields, are likewise included within the patent protection scope of the present invention.

What is claimed is:

1. A speech data recognition method for distinguishing regional accents, comprising:
receiving speech data from a user device, wherein the user device comprises a processor and a memory;
calculating a signal-to-noise ratio of the received speech data, wherein calculating the signal-to-noise ratio of the received speech data comprises:

extracting a fundamental tone data of the received speech data by using a fundamental tone extracting algorithm;

obtaining a noise data of the received speech data based on the extracted fundamental tone data; and calculating the signal-to-noise ratio of the received speech data by determining a ratio between signal power of the extracted fundamental tone data and signal power of the noise data in the received speech data;

selecting a portion of the received speech data having a signal-to-noise ratio greater than a preset threshold;

calculating a speech recognition confidence of the selected portion of the received speech data;

screening a regional speech data from the selected portion of the speech data based on the speech recognition confidence, wherein the screened regional speech data has a speech recognition confidence between about 30% and about 80%; and determining a region to which the screened regional speech data belongs based on a regional attribute of the screened regional speech data.

2. The method according to claim 1, wherein the regional attribute includes a location corresponding to a source IP address of the received speech data, or a location corresponding to a source user of the received speech data.

3. The method according to claim 1, wherein the calculating the speech recognition confidence of the selected portion of the received speech data comprises:

calculating the speech recognition confidence of the selected portion of the received speech data based on likelihood, state residing information, likelihood ratio of the selected portion of the received speech data, or a combination thereof.

4. The method according to claim 1, wherein the fundamental tone extracting algorithm comprises at least one of a spectral subtraction, a Wiener-filtration, or a short-term spectrum minimum mean square error estimation method.

5. A speech data recognition apparatus for distinguishing regional accents, comprising:

one or more hardware processors and a memory, the one or more hardware processors configured to:

receive speech data from a user device;

extract a fundamental tone data of the received speech data by using a fundamental tone extracting algorithm;

obtain a noise data of the received speech data based on the extracted fundamental tone data;

determine a ratio between signal power of the extracted fundamental tone data and signal power of the noise data in the received speech data to calculate a signal-to-noise ratio of the received speech data;

select a portion of the received speech data having a signal-to-noise ratio greater than a preset threshold;

calculate a speech recognition confidence of the selected portion of the received speech data;

screen a regional speech data from the selected portion of the speech data based on the speech recognition confidence, wherein the screened regional speech data has a speech recognition confidence between about 30% and about 80%; and determine a region to which the screened regional speech data belongs based on a regional attribute of the screened regional speech data.

6. The apparatus according to claim 5, wherein the regional attribute comprises a location corresponding to a source IP address of the received speech data, or a location corresponding to a source user of the received speech data.

7. The apparatus according to claim 5, wherein the one or more hardware processors configured to calculate the speech recognition confidence of the selected portion of the received speech data based on likelihood, state residing information, likelihood ratio of the selected portion of the received speech data, or a combination thereof.

8. The apparatus according to claim 5, wherein the fundamental tone extracting algorithm comprises at least one of a spectral subtraction, a Wiener-filtration, or a short-term spectrum minimum mean square error estimation method.

9. A server for performing a speech data recognition for distinguishing regional accents in received speech data, the server comprising:

a processor, a memory, and a computer program, wherein the computer program is stored in the memory, wherein the computer program is executed by the processor, and wherein the computer program comprises instructions for:

calculating a signal-to-noise ratio of the received speech data, wherein calculating the signal-to-noise ratio of the received speech data comprises:

extracting a fundamental tone data of the received speech data by using a fundamental tone extracting algorithm;

obtaining a noise data of the received speech data based on the extracted fundamental tone data; and calculating the signal-to-noise ratio of the received speech data by determining a ratio between signal power of the extracted fundamental tone data and signal power of the noise data in the received speech data;

selecting a portion of the received speech data having a signal-to-noise ratio greater than a preset threshold;

calculating a speech recognition confidence of the selected portion of the received speech data;

screening a regional speech data from the selected portion of the speech data based on the speech recognition confidence, wherein the screened regional speech data has a speech recognition confidence between about 30% and about 80%; and determining a region to which the screened regional speech data belongs based on a regional attribute of the screened regional speech data.

* * * * *